J. T. PETERS.
TOY AUTOMOBILE.
APPLICATION FILED JULY 5, 1921.
1,432,893.
Patented Oct. 24, 1922.
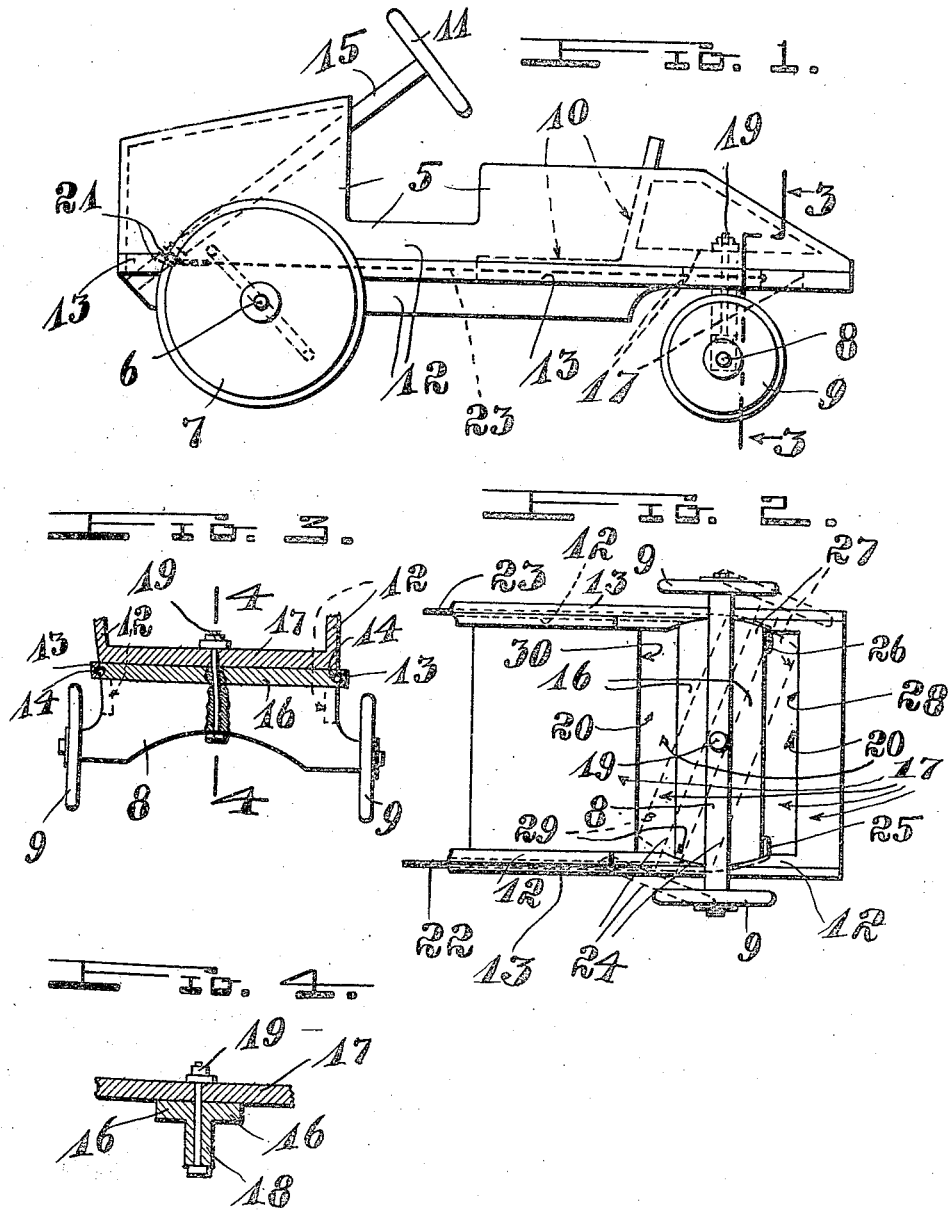
INVENTOR.
JAMES T. PETERS,
BY: *[signature]*,
his Atty.

Patented Oct. 24, 1922.

1,432,893

UNITED STATES PATENT OFFICE.

JAMES T. PETERS, OF LOS ANGELES, CALIFORNIA.

TOY AUTOMOBILE.

Original application filed October 27, 1920, Serial No. 420,013. Divided and this application filed July 5, 1921. Serial No. 482,532.

*To all whom it may concern:*

Be it known that I, JAMES T. PETERS, a citizen of the United States, residing at Los Angeles, in the county of Los Angeles and State of California, have invented a new and useful Toy Automobile, of which the following is a specification.

The invention relates to devices intended as play-things for children having a body in the shape of an automobile with a seat from which a child may propel and control the operating mechanism of the device.

One of the objects of this invention is to provide a toy automobile of a simple construction with simple operating mechanism, easily handled and easily kept in working condition by a child.

Another object is to provide steering mechanism in the rear end of the toy automobile, connected by flexible means with the steering post in the front end of the device.

Other objects will appear from the following description and appended claims as well as from the accompanying drawing, in which—

Fig. 1 is a side elevation of a toy automobile embodying the principles and details of the invention disclosed by this application.

Fig. 2 is a bottom side view of the automobile in Fig. 1, illustrating the rear axle and wheels controlled by flexible means from the front end of the device.

Fig. 3 is a section through the automobile of Fig. 1 on line 3—3.

Fig. 4 is a section on line 4—4 of Fig. 3.

This specification is a revised form of matter extracted from the application filed Oct. 27, 1920, Serial No. 420,013, since a division was required in the original application.

The body 5 of the device illustrated in Fig. 1 is made in the shape of an automobile body. 6 designates a front propelling axle, and 7 designates the front driving and propelling wheels, for supporting the front end of the body. Another shaft 8 with the wheels 9 supports the rear end of the body. A seat 10 is provided in the body so that a child can sit within the device for operating the device, the front propelling shaft 6 to be at a distance from the seat 10 so as to come within reach of the feet of the child sitting in the seat, and the hand wheel 11 being directly in front of the child within easy reach of its hands for controlling the steering operation of the rear axle 8. The sides 12 of the body 5, and the cover-pieces 13 are hollowed out or grooved, as indicated at 14 in Fig. 3 considered in connection with the illustration in Figs. 1 and 2, to extend from a point near the front end of the body to a point to meet the ends of the upper portion of the rear axle, so as to form conduits or spaces for the connecting means between the steering post 15 and the rear axle 8.

The several members of the body 5, including the cover-pieces 13, if made of wood, can, of course, be attached or connected together in various different ways, well known in the art, as gluing, or tacking, without materially affecting the invention. The rear axle is preferably made of T-shaped cross section as illustrated in Fig. 4, the upper flanges 16 forming the guiding and supporting portions for the axle-portion proper 18, the bolt 19 connecting the axle pivotally with the bottom 17 of the body. The upper flange portions 16 of the rear axle serve to seat and rest under the underside of the bottom 17 of the body, so that the rear axle can be freely operated around the bolt 19. The portion 18 of the axle is of a height in proportion to the diameter of the rear wheels, and the arrangement of the axle and wheels is made so that the wheels can be swung to positions below the body of the automobiles, the wheels not limiting such swinging or steering movements of the axle. The underside of the body is provided with a recess 20, indicated in Fig. 2, within which the flange portions 16 of the rear axle are disposed for swinging and steering movements. The connecting member between the steering post 15 and the rear axle 8 is preferably of flexible material, as a cord, cable, and a flexible wire. This flexible connecting member is wound around the steering post as indicated at 21 in Fig. 1, so as to produce a pulling or a drawing in the end 22 of the flexible member on one side of the device while at the same time releasing the end 23 on the other side of the device, as indicated in Fig. 2.

Pulling the end 22 and releasing the end 23 of the flexible member as illustrated in Fig. 2, brings the rear axle eventually to the position indicated in dotted lines at 24, since the end 22 is secured to the rear axle at 25 and the end 23 is secured to the rear axle at 26. The movement of the rear axle is limited inasmuch as the disposing of the rear axle within the recess 20 prevents the corner 27 from turning beyond the edge 28 of the recess and also prevents the corner 29 from turning beyond the edge 30 of the recess. The space between the edges 28 and 30 limits the movements of the rear axle around the pin or bolt 19 in either direction, as will easily be understood, without preventing the wheels 9 from turning, since the wheels are well below the body at any time of such steering movements. A cord can easily be replaced between the steering post and the rear axle. The rear axle with the proportionally large flanges 16 furnishes a stable support for the rear end of the automobile, at the same time easily operated.

Having thus described my invention, I claim:

1. In a toy automobile of the class described having a body, a front propelling axle, a steering post in the front end of the body, and a seat in the body back of the front propelling axle and back of the steering post; a rear steering axle having means for engaging with the underside of the said body for a limited swinging movement, a wheel turnable on each end of the rear steering axle normally disposed at points sidewise of the said body and adapted to swing below the body, and means for operatively engaging the ends of the axle with said steering post.

2. In a toy automobile, in combination with a body having a recessed underside in the rear end, an axle having a flanged top to swingably engage within the recessed underside in the body, the edges in the recess forming the stops for the swinging movements of the axle.

3. In a toy automobile of the class described, a framework in the obvious shape of a miniature automobile body, a steering post in the front end of the body, a steering axle pivotally engaged to the bottom of the rear end of the body, a wheel turnably mounted on each end of the axle normally disposed sidewise of the body and adapted to swing below the body, flexible means secured to the ends of the axle and wound around the steering post, and means in the body for guiding the flexible means between the front steering post and the rear steering axle.

4. In a toy automobile, a body having a recess in its underside in the rear end, a steering post in the front end of the body, an axle pivotally engaged with the underside of the body swingable within the recess, a wheel turnably mounted on each end of the axle, flexible connecting means between the steering post and the axle, and means for guiding the flexible means.

5. In a toy automobile, in combination with a front steering post, a body, a rear steering axle pivotally mounted and connected to the underside of the body, and flexible connecting means between the steering post and the rear axle; a moulding placed on the body having means to leave a passage between the moulding and the body for the flexible connecting means from a point near the rear axle to a point near the front steering post.

In testimony that I claim the foregoing as my invention I have signed my name in the presence of two subscribing witnesses.

JAMES T. PETERS.

Witnesses:
O. H. KRUEGER,
JESSIE A. MANOCK.